(12) United States Patent
Tanimura et al.

(10) Patent No.: US 7,472,681 B2
(45) Date of Patent: Jan. 6, 2009

(54) THROTTLE VALVE UNIT (75) Inventors: Hiroshi Tanimura, Kariya (JP); Atsushi Tanaka, Kariya (JP); Masanobu Kondo, Obu (JP)

(73) Assignees: Denso Corporation (JP); Aisan Kogyo Kabushiki Kaisha (JP)

( * ) Notice: Subject to any disclaimer, the term of this patent is extended or adjusted under 35 U.S.C. 154(b) by 0 days.

(21) Appl. No.: 11/785,138

(22) Filed: Apr. 16, 2007

(65) Prior Publication Data

US 2007/0240678 A1 Oct. 18, 2007

(30) Foreign Application Priority Data

Apr. 18, 2006 (JP) ............... 2006-114740

(51) Int. Cl.
*F02D 9/08* (2006.01)
*F02D 11/10* (2006.01)
*F16K 1/22* (2006.01)

(52) U.S. Cl. .................. 123/337; 123/399; 251/306

(58) Field of Classification Search .......... 123/336, 123/337, 399; 251/304–306
See application file for complete search history.

(56) References Cited

U.S. PATENT DOCUMENTS

| | | | |
|---|---|---|---|
| 5,718,202 A * | 2/1998 | Bentz et al. ............... 123/399 | |
| 5,925,265 A | 7/1999 | Watanabe et al. | |
| 5,979,871 A | 11/1999 | Forbes et al. | |
| 6,005,217 A | 12/1999 | Watanabe et al. | |
| 6,129,071 A | 10/2000 | Pursifull | |
| 6,170,461 B1 | 1/2001 | Pursifull | |
| 6,194,680 B1 | 2/2001 | Watanabe et al. | |
| 6,352,241 B1 * | 3/2002 | Hannewald et al. ..... 251/129.11 | |
| 6,454,242 B1 * | 9/2002 | Garrick et al. ............... 251/208 | |
| 6,761,348 B2 * | 7/2004 | Michels et al. ............... 251/305 | |
| 6,763,582 B2 * | 7/2004 | Kaiser et al. ................... 29/854 | |

(Continued)

FOREIGN PATENT DOCUMENTS

JP 10-280981 10/1998

(Continued)

OTHER PUBLICATIONS

German Office Action, dated Aug. 6, 2008, issued in corresponding German Appln. No. 10 2007 000 233.7-13 with English translation.

(Continued)

*Primary Examiner*—Willis R. Wolfe, Jr.
*Assistant Examiner*—Johnny H. Hoang
(74) *Attorney, Agent, or Firm*—Nixon & Vanderhye PC (57) ABSTRACT

A throttle valve unit is disclosed that includes a main body having a cylinder portion defining a fluid passage. The main body also includes a fastening portion projecting from an outer peripheral surface of the cylinder portion for fastening to a separate member. The cylinder portion defines an axis. The throttle valve unit also includes a throttle valve that is rotatably supported by the cylinder portion for opening and closing the fluid passage. The throttle valve is supported by the cylinder portion at a support area. The fastening portion is provided at approximately the same axial position relative to the axis as the support area of the throttle valve and includes a plurality of mounting portions for coupling to the separate member and a plurality of connecting portions extending between the mounting portions.

12 Claims, 12 Drawing Sheets

U.S. PATENT DOCUMENTS

| | | | |
|---|---|---|---|
| 6,871,631 B2 * | 3/2005 | Bender | 123/337 |
| 6,886,806 B2 * | 5/2005 | Borasch et al. | 251/305 |
| 6,997,163 B2 * | 2/2006 | Arai et al. | 123/399 |
| 7,117,845 B2 * | 10/2006 | Iwaoka et al. | 123/337 |
| 2005/0204558 A1 | 9/2005 | Hannewald | |
| 2006/0000445 A1 | 1/2006 | Iwaoka et al. | |

FOREIGN PATENT DOCUMENTS

| | | |
|---|---|---|
| JP | 11-013562 | 1/1999 |
| JP | 11-062739 | 5/1999 |
| WO | WO 02/062551 | 8/2002 |

OTHER PUBLICATIONS

Chinese Office Action, dated Aug. 11, 2008, issued in corresponding Chinese Appln. No. 200710097065.2 with English translation.

* cited by examiner

THROTTLE VALVE UNIT

CROSS REFERENCE TO RELATED APPLICATION

The following is based on and claims priority to Japanese Patent Application No. 2006-114740, filed Apr. 18, 2006, which is hereby incorporated by reference in its entirety.

FIELD

The following relates to a throttle valve unit for a vehicle internal combustion engine or the like.

BACKGROUND

Various throttle valve units have been previously proposed. For instance, JP-A-H11-62739 discloses a throttle valve unit connected to the intake pipe 8 of an automobile. This throttle valve unit, as shown FIG. 20 and FIG. 21, includes a main body 9 with a cylinder portion 91 that defines an intake air passage 90, a fastening portion 95 integrally formed on the outer peripheral surface 941 of the cylinder portion 91, and a throttle valve 92 that is rotatably supported by the cylinder portion 91 for opening and closing the intake air passage 90. The fastening portion 95 has a bolt hole 96, and the flange portion 85 of the intake pipe 8 also has a bolt hole 86. A bolt 81 extends through the bolt holes 96, 86 to thereby couple the main body 9 and the intake pipe 8.

Figure 20:
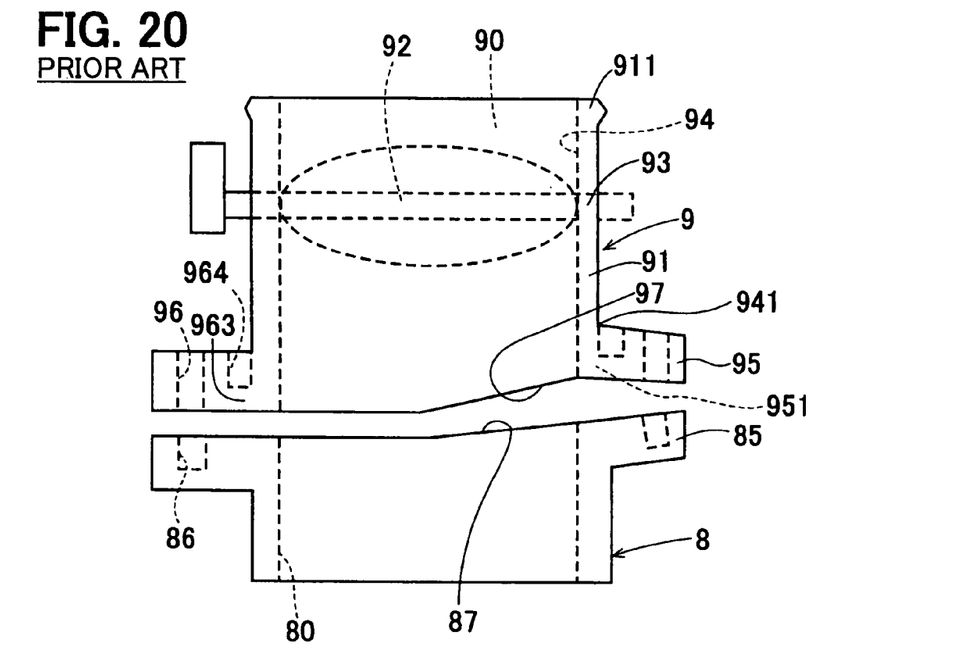
FIG. 20 is a side view of a prior art throttle valve unit.
Figure 21:
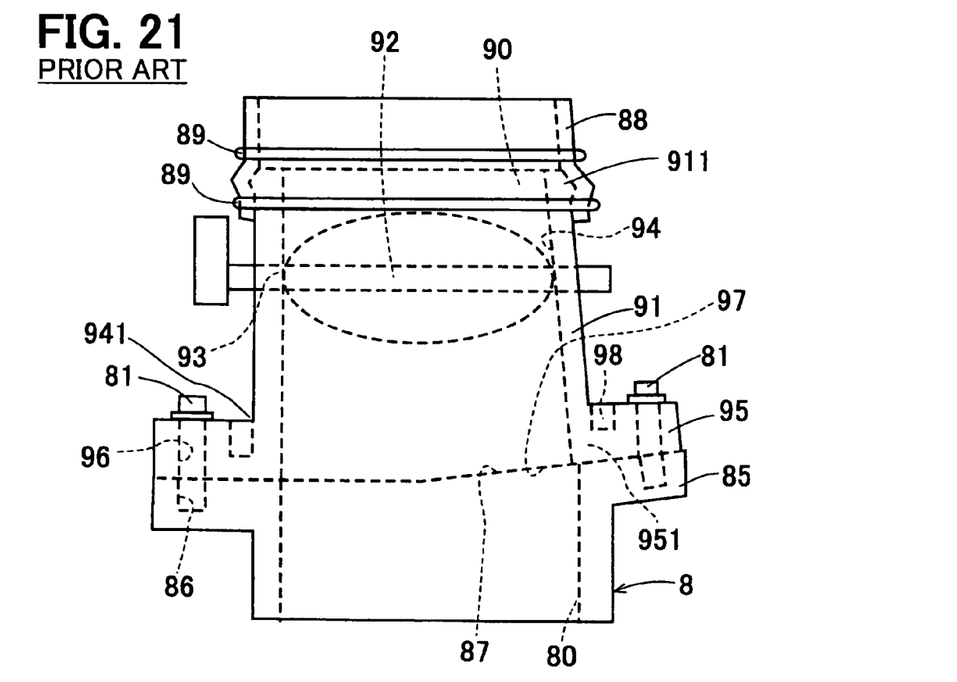
FIG. 21 is a side view of the prior art throttle valve unit coupled to an intake pipe.

Here, as shown in FIG. 20, the fastening portion 95 can shrink and distort when manufactured whereby the bottom surface 97 of the fastening portion 95 becomes cambered. When the cambered bottom surface 97 is fastened to the flange portion 85 of the intake pipe 8 with the bolt 81, as shown in FIG. 21, the bottom surface 97 can be displaced due to the different shape of the abutment surface 87 of the flange portion 85 of the intake pipe 8. This displacement of the fastening portion 95 can be transmitted to the cylinder portion 91 such that the inner peripheral surface 94 of the cylinder portion 91 deforms in the radial direction.

In partial response to this problem, JP-A-H11-62739 discloses a recessed portion 964 formed in a middle portion 963 between the bolt hole 96 and the cylinder portion 91 to reduce the rigidity of the middle portion 963. Since the middle portion 963 is reduced in rigidity, when the fastening portion 95 is fastened to the intake pipe 8, the fastening portion 95 can more easily deflect according to the shape of the abutment surface 87 of the flange portion 85 of the intake pipe 8 due to the fastening force of the bolt 81. Thus, distortion caused when the fastening portion 95 is manufactured is corrected.

Furthermore, JP-A-H8-8229 and JP-A-H10-280981 also disclose a throttle valve unit having a recessed portion formed between a fastening portion and the outer peripheral surface of a cylinder portion.

However, in these prior art devices, a support area 93 is included for supporting the throttle valve 92 in the cylinder portion 91. The support area 93 is spaced along the axis of the cylinder portion 91 from a connecting portion 951 of the fastening portion 95. As such, the support area 93 of the throttle valve 92 is relatively thin and hence lower in rigidity than the connecting portion 951 of the fastening portion 95. For this reason, the support area 93 of the throttle valve 92 can be easily deformed.

For example, the bolt hole 96 is coupled to the cylinder portion 91 via the middle portion 963. Thus, even if the middle portion 963 has a recessed portion 964 and is hence reduced in rigidity as described above, a forcible deforming force acting in the radial direction in the bolt hole 96 when the fastening portion 95 is fastened with the bolt 81 can transmit through the middle portion 963 to the support area 93 of the throttle valve 92.

Moreover, when a hose 88 is fitted on the top end portion 911 of the cylinder portion 91 and is fastened thereto by a hose band 89, the top end portion 911 receives a load acting in the radial direction and hence the inner peripheral surface 94 of the top end portion 911 may be deformed. The deformation of the top end portion 911 can be transmitted to the support area 93 of the throttle valve 92 in the cylinder portion 91.

As such, when the low-rigidity support area 93 of the throttle valve 92 receives the bolt fastening force from the bolt 81 and/or the load by the hose band, the support area 93 can be deformed in the radial direction. When the support area 93 is deformed inside in the radial direction, the inner peripheral surface 94 of the support area 93 in the cylinder portion 91 and the throttle valve 92 may abut, thereby degrading control of the opening of the throttle valve 92.

SUMMARY

A throttle valve unit is disclosed that includes a main body having a cylinder portion defining a fluid passage. The main body also includes a fastening portion projecting from an outer peripheral surface of the cylinder portion for fastening to a separate member. The cylinder portion defines an axis. The throttle valve unit also includes a throttle valve that is rotatably supported by the cylinder portion for opening and closing the fluid passage. The throttle valve is supported by the cylinder portion at a support area. The fastening portion is provided at approximately the same axial position relative to the axis as the support area of the throttle valve and includes a plurality of mounting portions for coupling to the separate member and a plurality of connecting portions extending between the mounting portions.

DETAILED DESCRIPTION

A throttle valve unit is disclosed below that includes a main body with a cylinder portion defining a fluid passage and a fastening portion integrally projecting in a centrifugal direction from the outer peripheral surface of the cylinder portion. The fastening portion enables attachment to a separate member. The throttle valve unit also includes a throttle valve that is rotatably supported by the cylinder portion for opening and closing the fluid passage.

The fastening portion can be fastened to the separate member and integrally projects in the centrifugal direction from the outer peripheral surface of the cylinder portion. In each of the embodiments of the fastening portion shown in FIGS. 1A to 1C, the fastening portion 3 has a plurality of mounting portions 31. Each mounting portion 31 has a fastener mounted therein for fastening to the separate member as will be described in greater detail below. The mounting portions 31 are arranged at equal intervals in the circumferential direction on the outer peripheral surface 45 of the cylinder portion 41. As such, when the fastening portion 3 is coupled to the separate member, resultant forces applied outward in the radial direction are transferred equally to the cylinder portion 41. This balance of forces effectively reduces undesirable deformation of the cylinder portion 41.

Figure 1A:
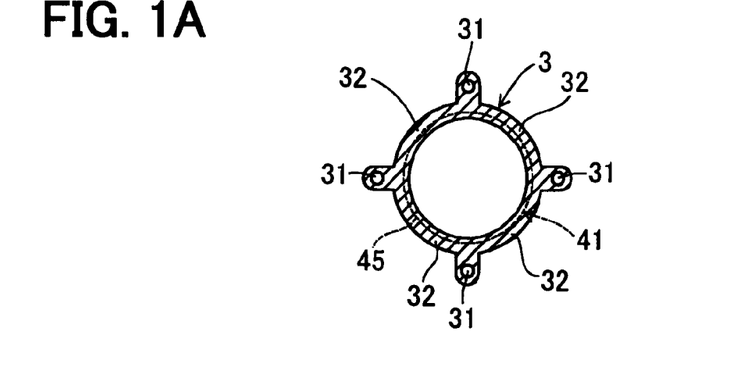
FIGS. 1A to 1C are longitudinal views of various embodiments of a fastening portion of a throttle valve unit.
Figure 1B:
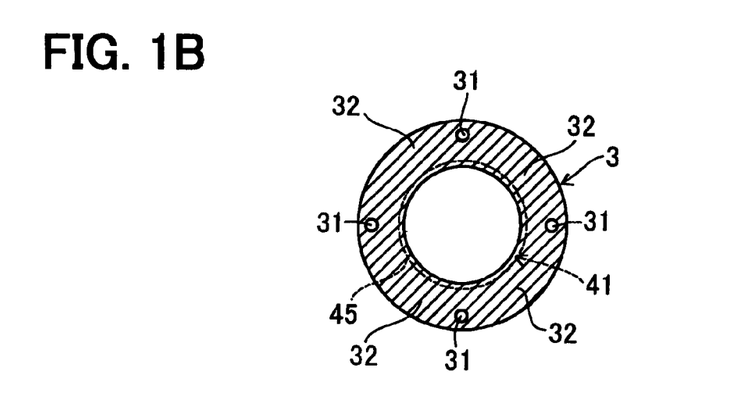
Figure 1C:
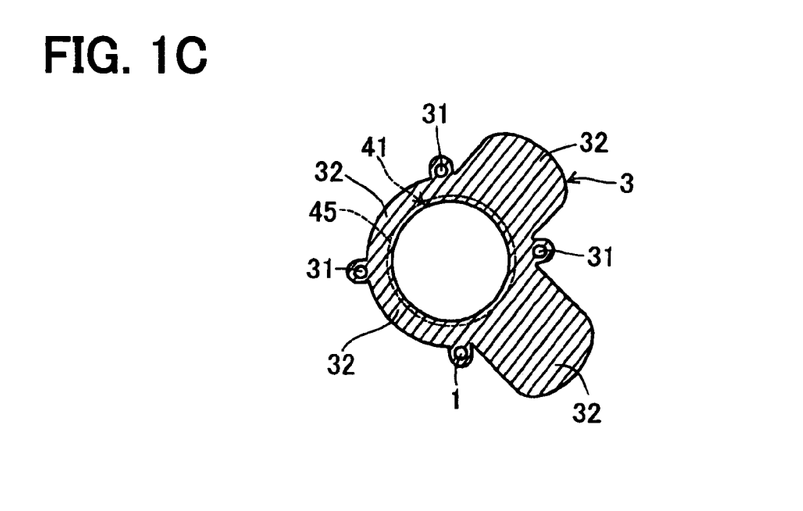
Figure 2:
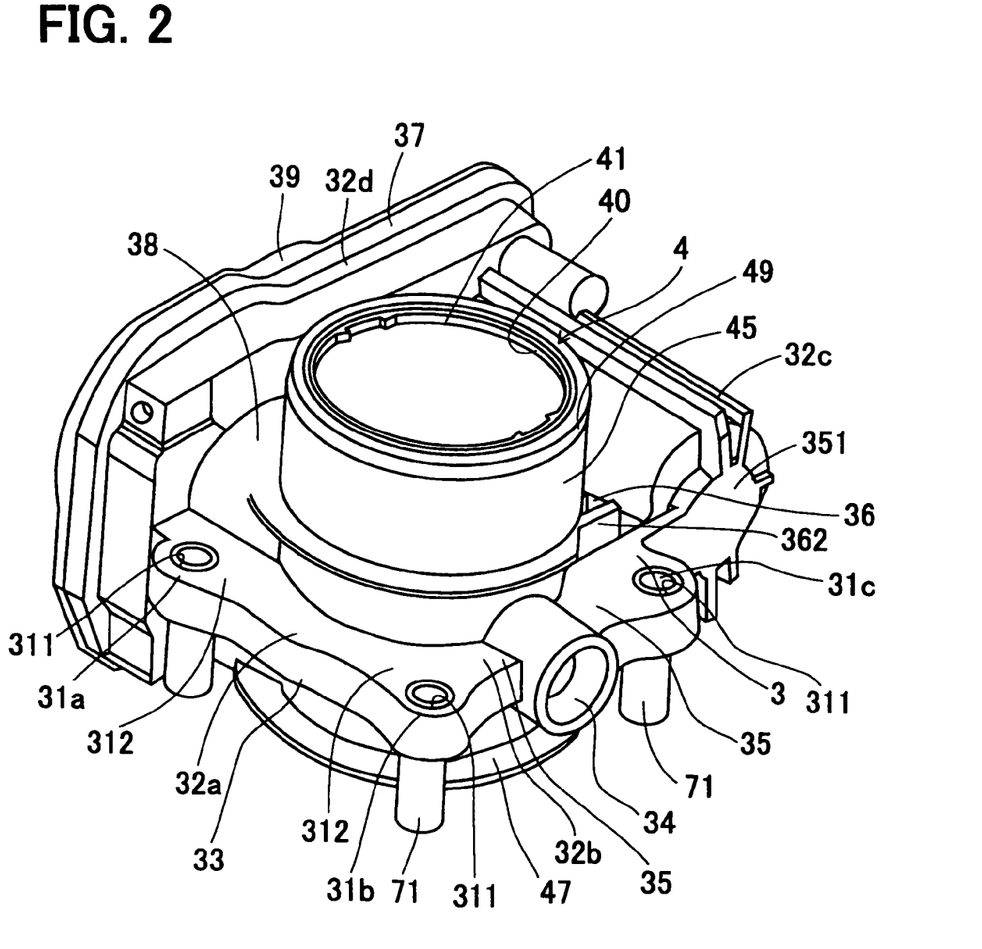
FIG. 2 is a perspective view of a throttle valve unit of first embodiment.

The fastening portion 3 also includes a plurality of connecting portions 32 extending between and connecting the mounting portions 31. The mounting portions 31 are fastened to the separate member by the fasteners. The resultant fastening forces are transmitted via the connecting portions to the entire outer peripheral surface of the support area of a throttle valve, thereby constraining the entire outer peripheral surface. Moreover, the fastening portion 3 including the plurality of mounting portions 31 and the connecting portions 32 is formed on the entire outer peripheral surface of the support area of the throttle valve. For this reason, rigidity in the radial direction of the entire outer peripheral surface of the support area is relatively high. Thus, deformation of the support area can be further effectively reduced.

In the embodiment shown in FIG. 1A, the mounting portions 31 extend radially from the outer surface of the cylinder portion 41 further than the connecting portions 32. In another embodiment shown in FIG. 1B, the mounting portions 31 and connecting portions 32 extend an equal distance in the radial direction from the cylinder portion 41. In still another embodiment shown in FIG. 1C, some of the connecting portions 32 extend radially from the outer surface of the cylinder portion 41 further than the mounting portions 32.

Preferably, the connecting portion has a flange-shaped portion formed along the outer peripheral surface of the cylinder portion. The flange-shaped portion is a portion having a width elongated to some extent in the centrifugal direction along the outer peripheral surface of the cylinder portion. As such, rigidity in the radial direction in the support area of the throttle valve can be increased equally in the circumferential direction of the cylinder portion. Moreover, the constraining force when the fastening portion is fastened to the separate member is transmitted equally to the separate member. Thus, the flange-shaped portion can effectively reduce the undesirable deformation of the support area of the throttle valve.

In one embodiment, the connecting portions have a bearing boss for rotatably supporting a shaft of the throttle valve, a driving chamber for housing a driving device that drives the throttle valve, and a gear chamber housing a gear mechanism that transmits a rotational driving force to the throttle valve from the driving device.

Furthermore, in one embodiment, the fastening portion has a recessed portion. In one embodiment, the recessed portion extends in the centrifugal direction (i.e., in a direction transverse to the axis of the cylinder portion. As such, the thickness in the axial direction of the fastening portion is reduced, and the thickness of the support area of the throttle valve is substantially uniform, which reduces shrinkage of the fastening portion during molding. Moreover, since the fastening portion is reduced in thickness, the throttle valve unit can be reduced in weight and cost.

Here, the recessed portion formed in a portion on the cylinder portion side of the mounting portion is reduced in thickness in the portion on the cylinder portion side of the mounting portion, thereby being reduced in rigidity and hence being easily deflected in the axial direction. For this reason, even if a deviation from flatness occurs in the abutment surface of the separate member, the mounting portion is deflected along the abutment surface of the separate member to account for deformation caused by the deviation from flatness of the separate member. For this reason, the recessed portion can reduce deformation transmitted to the cylinder portion.

On the other hand, the recessed portion formed on the connecting portion includes ribs formed thereon, and the ribs extend in the axial direction of the cylinder portion. These ribs are not included in the recessed portion between the mounting portion and the cylinder portion. The connecting portion is increased in rigidity in the axial direction due to the ribs. Moreover, even if the connecting portion is increased in rigidity in the axial direction, the recessed portion of the mounting portion does not have a rib provided therein, so the mounting portion can be deflected in the axial direction to prevent the transmission of the deformation caused by the deviation from flatness of the separate member.

In one embodiment, the ribs on the connecting portion are arranged in a truss structure in which the ribs are arranged in sequential triangles with vertexes at the top end and bottom end of the recessed portion. As such, the recessed portion is higher in rigidity in the axial direction. The fasteners mounted in the mounting portions are, for example, bolts, clamps, or the like.

The fluid passage formed in the cylinder portion is a flow passage through which a substance flows. The flowing substance may be of any suitable type, such as gas, liquid, and powder. The direction of flow of the substance flowing through the fluid passage may be any direction in the axial direction of the cylinder portion.

The cross-sectional shape in the radial direction of the cylinder portion may be circular or polygonal.

The throttle valve unit is formed of resin, metal, or the like.

Embodiment 1

Figure 5:
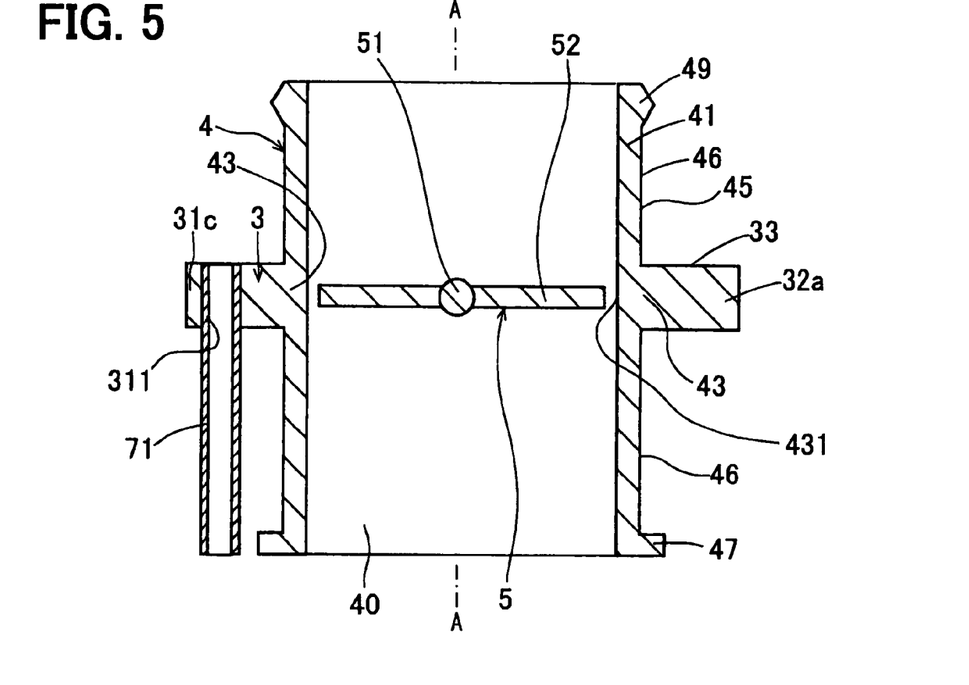
FIG. 5 is a sectional view of the throttle valve unit of the first embodiment taken along the line V-V of FIG. 3.

One embodiment of the present invention will be described with reference to FIG. 2 to FIG. 8. The throttle valve unit of this embodiment, includes a main body 4 having a cylinder portion 41 defining an intake passage 40 therein. The cylinder portion 41 and intake passage 40 share a common axis A as shown in FIGS. 5 and 7. The main body 4 also includes a fastening portion 3 integrally projecting in the centrifugal direction away from the axis A and from the outer peripheral surface 45 of the cylinder portion 41. The fastening portion 3 is for coupling the main body 4 to an intake pipe 8 of a separate member. The throttle valve unit further includes a throttle valve 5 that is rotatably supported by the cylinder portion 41 and opens or closes the intake passage 40. As shown in FIG. 5, the fastening portion 3 is provided on a support area 43, which supports the throttle valve 5. In other words, the throttle valve 5 is supported by the cylinder portion 41 via the support area 43, and the fastening portion 3 is provided at approximately the same position relative to the axis A as the support area 43.

Figure 3:
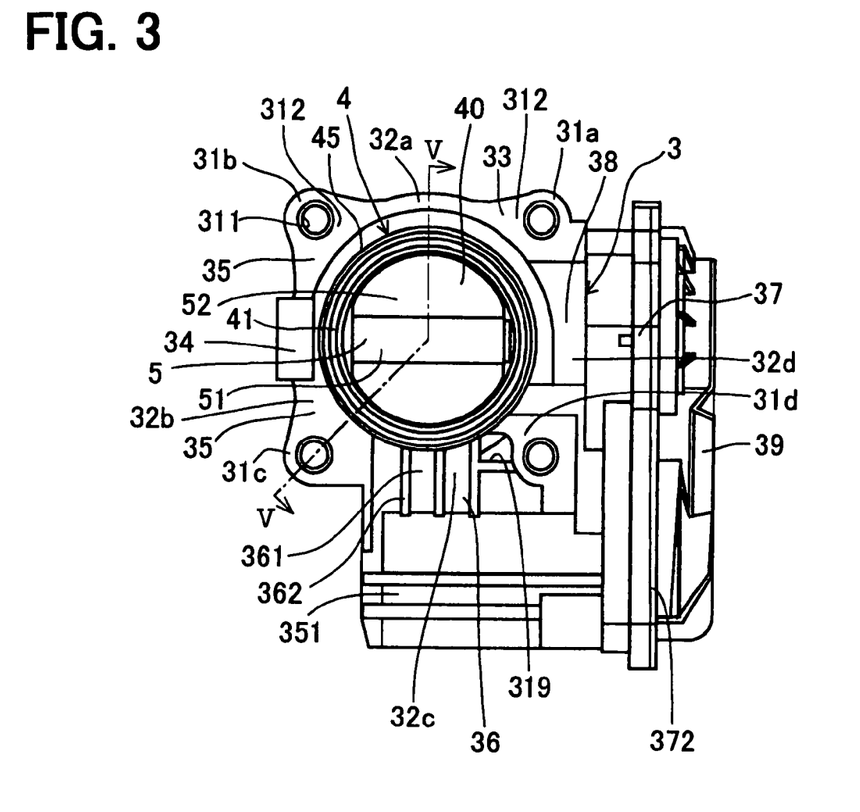
FIG. 3 is a plan view of the throttle valve unit of the first embodiment.
Figure 4:
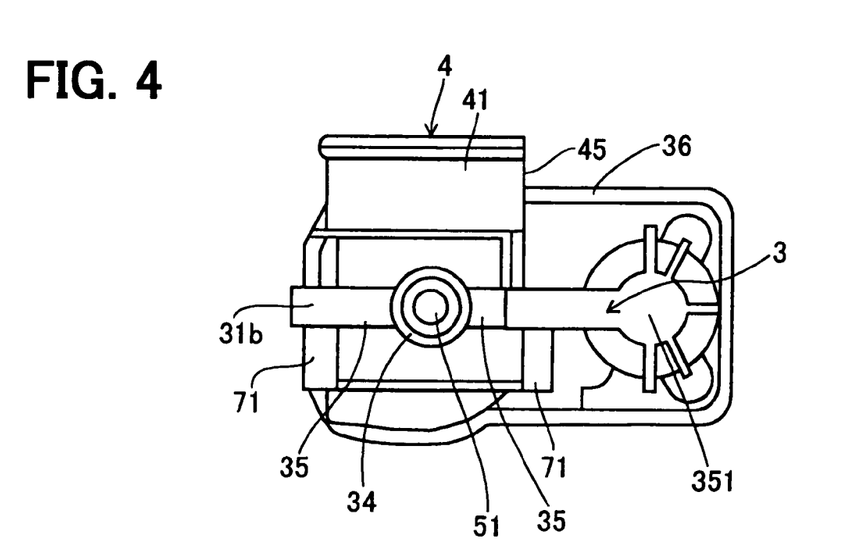
FIG. 4 is a side view of the throttle valve unit of the first embodiment.

The fastening portion 3, as shown in FIG. 3, includes a plurality of mounting portions 31a, 31b, 31c, 31d in which fasteners for coupling to the intake pipe 8 are mounted. The mounting portions 31a-31d are arranged at equal intervals along the outer peripheral surface 45 of the cylinder portion 41. The fastening portion 3 also includes a plurality of connecting portions 32a, 32b, 32c, 32d which extend between and connect the plurality of adjacent mounting portions 31a-31d.

Each of the mounting portions 31a, 31b, 31c, 31d has a collar securing hole 311 into which fasteners are mounted. In the embodiment shown, the fasteners are bolts 7 and collars 71. The metal collar 71 is thermally pressed into the collar securing hole 311. The collars 71 reinforce the mounting portions 31a, 31b, 31c, 31d that are made of resin and are weaker than metal. The bolt 7 is inserted into the collar 71, as shown in FIG. 7. The tip 70 of the bolt 7 is screwed into the threaded hole 82 of a flange portion 81 of the intake pipe 8. The collar 71 projects down from the interior of the collar securing hole 311 and has a length that reaches the lower portion of the cylinder portion 41. The collar 71 receives an axial force via the bolt 7.

The connecting portion 32a has a flange-shaped portion 33 formed along the outer peripheral surface 45 of the cylinder portion 41. The flange-shaped portion 33, as shown in FIG. 3, is connected to the end portion 312 on the cylinder portion 41 side in the mounting portion 31a and the end portion 312 on the cylinder portion 41 side of the mounting portion 31b.

The connecting portion 32b has a cylindrical bearing boss 34 that rotatably supports the valve shaft 51 of the throttle valve 5 and a flange-shaped portion 35 formed on both sides of the side surface in the bearing boss 34.

The flange-shaped portions 33, 35 have a nearly uniform radial length extending from the outer peripheral surface 45 of the cylinder portion 41. Also, the radial length of the flange-shaped portions 33, 35 is less than the radial length of the mounting portions 31a and 31b.

The connecting portion 32c has a driving chamber 351 and a driving chamber connecting portion 36 for connecting the driving chamber 351 and the outer peripheral surface 45 of the cylinder portion 41. A motor (i.e., a driving device) is housed in the driving chamber 351 for rotatably driving the throttle valve 5. Rotational position of the motor is controlled based on the output of an opening sensor (not shown) of the throttle valve 5, the load detection value of an accelerator, and the combustion state of the internal combustion engine. The driving chamber connecting portion 36 has a recessed portion 361 extending in the centrifugal direction of the cylinder portion 41 and ribs 362 extending between the cylinder portion 41 and the driving chamber 351. The ribs 362 also extend vertically in a direction parallel to the axis A.

As shown in FIG. 3, an opening 319 is included between the connecting portion 32c and the mounting portion 31d. The opening 319 ensures rigidity in the radial direction and reduces shrinkage of the resin during molding manufacturing processes.

The connecting portion 32d has a gear chamber 37 that houses a gear mechanism for transmitting a rotational driving force from the motor in the driving chamber 351 to the throttle valve 5. The connecting portion 32d also includes a gear connecting portion 38 that connects the gear chamber 37 and the outer peripheral surface 45 of the cylinder portion 41.

An opening 372 is also included for inserting the motor and the gear mechanism in the driving chamber 351 and in the gear chamber 37, respectively. The opening 372 is formed opposite to the cylinder portion 41 side of the gear chamber 37. Once the motor and the gear mechanism are inserted, the opening 372 is covered with a cover 39. The valve shaft 51 of the throttle valve 5 is rotatably coupled to the gear connecting portion 38. Moreover, a return spring (not shown) for biasing the throttle valve 5 toward a closed position is coupled to the gear connecting portion 38. The base end of the return spring is secured to the cylinder portion 41 and an urging end of the return spring is coupled to one end of the valve shaft 51.

The throttle valve 5 is composed of the valve shaft 51 and a valve body 52 secured to the valve shaft 51 and housed in the cylinder portion 41. The valve shaft 51 is supported by the cylindrical portion 41 via the support area 43. The valve body 52 turns around the rotational axis of the valve shaft 51. When the valve body 52 is positioned in the radial direction of the cylinder portion 41, the intake passage 40 formed in the cylinder portion 41 is closed. When the valve body 52 is positioned in the axial direction, the intake passage 40 is opened. The opening of the throttle valve 5 is determined by the balance between the torque of the motor 22 and the valve closing force of the return spring to thereby control the flow rate of intake air flowing in the intake passage 40.

Figure 6:
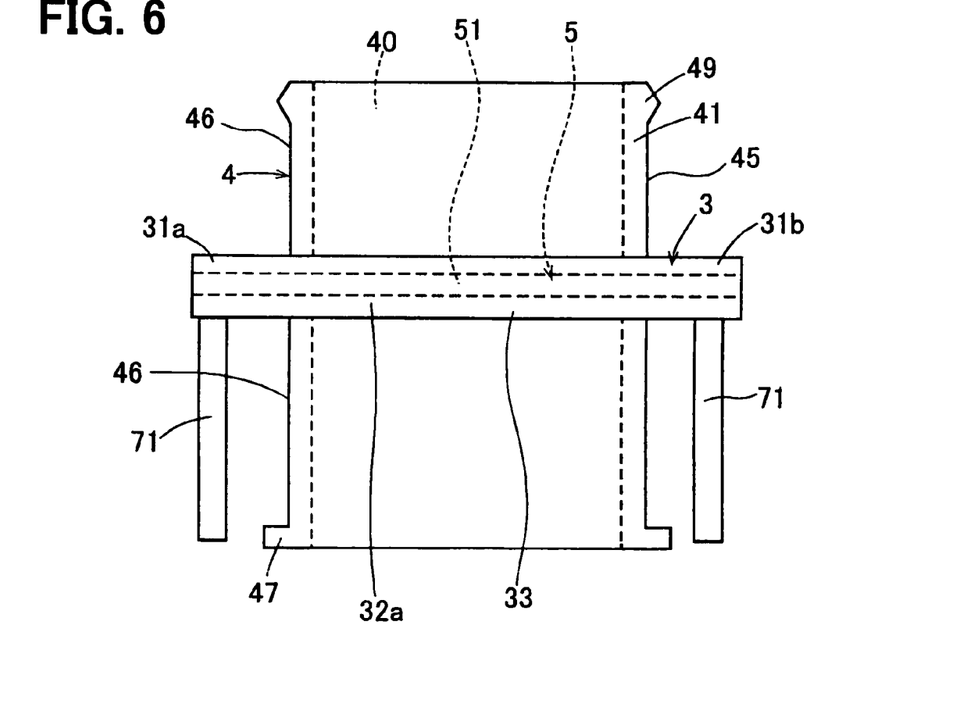
FIG. 6 is a side view of the throttle valve unit illustrating the relative position of a throttle valve shaft and a fastening portion in the first embodiment.
Figure 7:
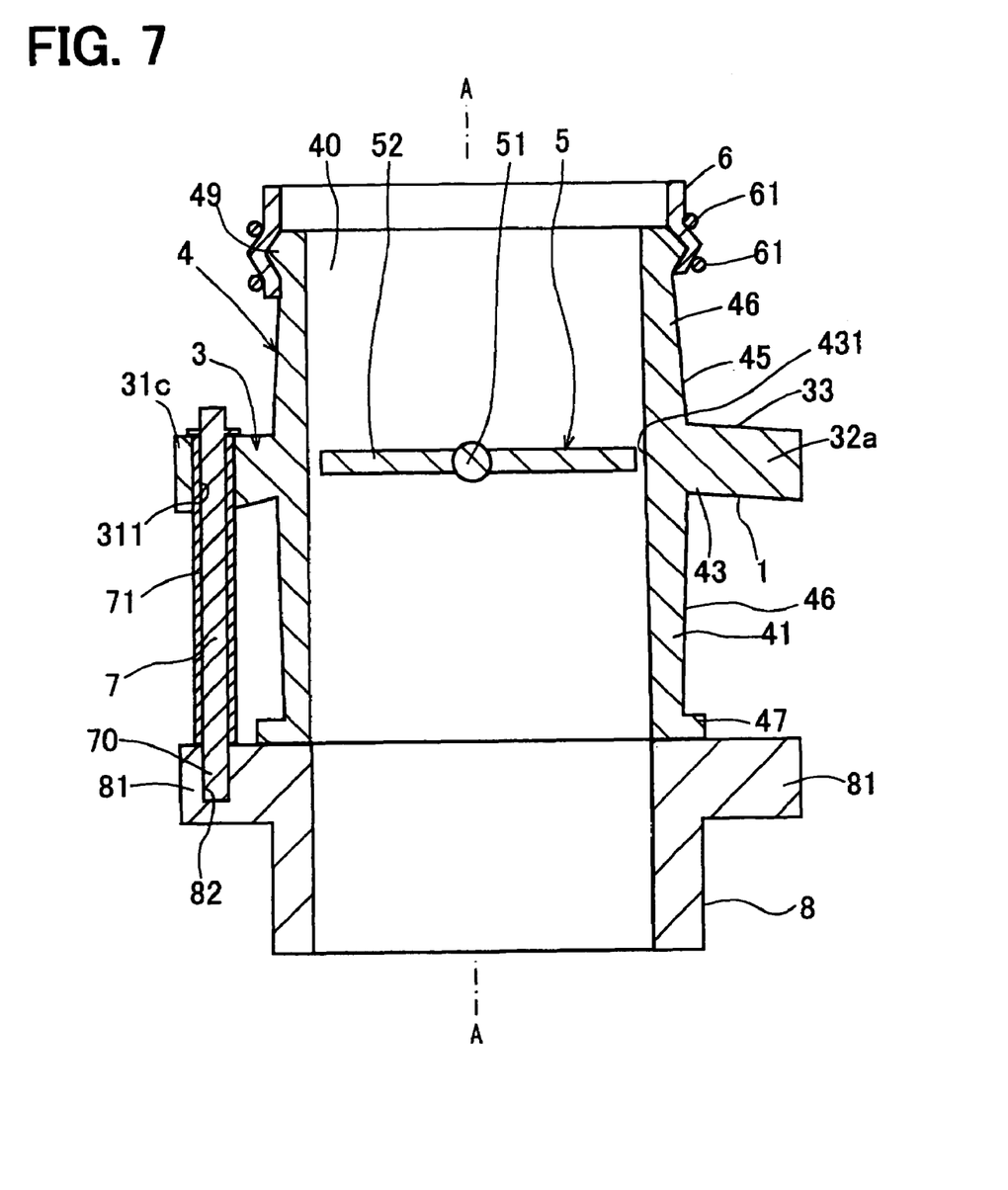
FIG. 7 is a sectional view of the throttle valve unit of the first embodiment coupled to an intake pipe.

As shown FIG. 5 to FIG. 7, the main body 4 also includes a projection 49 at a top end thereof. The projection 49 extends in the radial direction from the outer peripheral surface 45 for attachment of a hose 6. The hose 6 is fitted on the top end of the outer peripheral surface 45 of the cylinder portion 41 and is fastened and secured to the top end with a hose band 61.

An abutment portion 47 is also included at the bottom end of the cylinder portion 41 opposite from the projection 49. The abutment portion 47 projects in the centrifugal direction from the outer peripheral surface 45 for abutting on the flange portion 81 of the intake pipe 8. The length in the radial direction of the abutment portion 47 is sufficient to abut on the flange portion 81 of the intake pipe 8, but the length in the radial direction is less than that of the fastening portion 3. It will be understood that because the radial length of the abutment portion 47 is relatively small, the abutment portion 47 is less likely to deviate in flatness during manufacturing.

The main body 4 of the throttle valve unit of this embodiment is integrally molded of resin.

Figure 8:
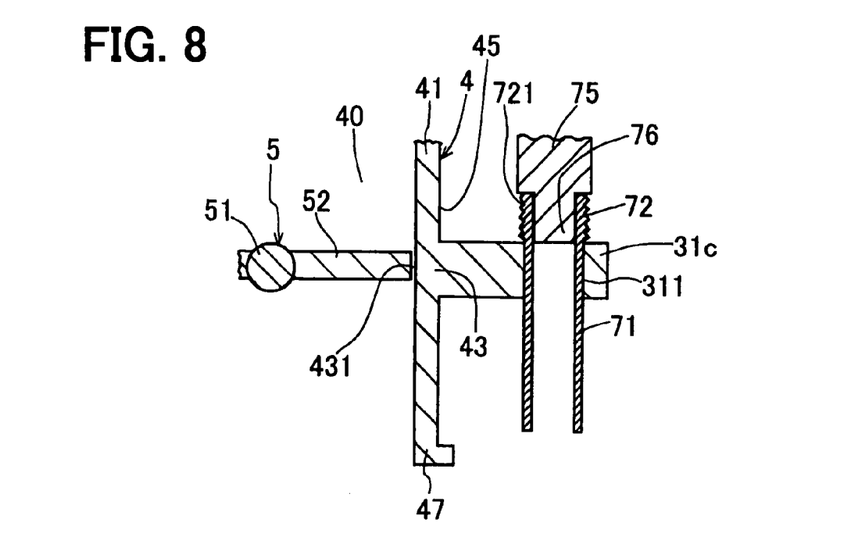
FIG. 8 is a detail sectional view of a portion of the throttle valve unit of the first embodiment.

Furthermore, in the embodiment shown in FIG. 8, the collar 71 includes a corrugated surface 721 formed on a fitted portion 72 thereof. The tip portion 76 of a heating pressing device 75 is fitted into the fitted portion 72, and the collar 71 is pressed into the collar securing hole 311 while being heated. As such, the collar 71 is fused to the inner wall of the collar securing hole 311 by the heat of the corrugated surface 72. In another embodiment, the collar 71 is coupled via an insert molding process in which the collar 71 is provided in a mold for molding the throttle valve unit and then pouring resin into the mold.

As shown in FIG. 7, the fastening portion 3 is provided at approximately the same axial position relative to the axis A as the support area 43 of the throttle valve 5. The support area 43 of the throttle valve 5 receives a fastening force from the fastening portion 3. Thus, the support area 43 of the throttle valve 5 has a force applied in the radial direction from the fastening portion 3. However, the forces area substantially balanced around the periphery support area 43 to thereby reduce undesirable deformation in the radial direction. Thus, the inner peripheral surface 431 of the support area 43 is unlikely to be deformed.

Moreover, the support area 43 of the throttle valve 5 includes the fastening portion 3 formed in the centrifugal direction from its outer peripheral surface 45. The fastening portion 3 includes the mounting portions 31a, 31b, 31c, 31d in which bolts are respectively mounted and connecting portion 32a, 32b, 32c, 32d extending between the adjacent mounting portions. For this reason, the support area 43 of the throttle valve 5 has a relatively high radial length than a general portion 46 axially spaced from the fastening portion 3. Thus, the support area 43 of the throttle valve 5 is more rigid in the radial direction than the general portion 46 making deformation of the support are 43 even less likely.

Hence, even if the support area 43 of the throttle valve 5 in the cylinder portion 41 receives a deforming force applied in the radial direction from the fastening force of the hose band, the support area 43 of the throttle valve 5 is unlikely to deform. Therefore, according to this embodiment, the deformation of the support area 43 of the throttle valve 5 in the cylinder portion 41 is reduced.

Moreover, the driving chamber 351 is arranged between the mounting portions 31c, 31d so the driving chamber 351 can be connected with the mounting portions 31c, 31d in a relatively small distance. For this reason, the resonant frequency of the driving chamber 351 increases, so the resonant frequency of the motor is outside the primary frequency band of combustion of the internal combustion engine. As a result, resonance of the driving chamber 351 can be reduced and hence the reliability of the motor can be secured.

Embodiment 2

Figure 9:
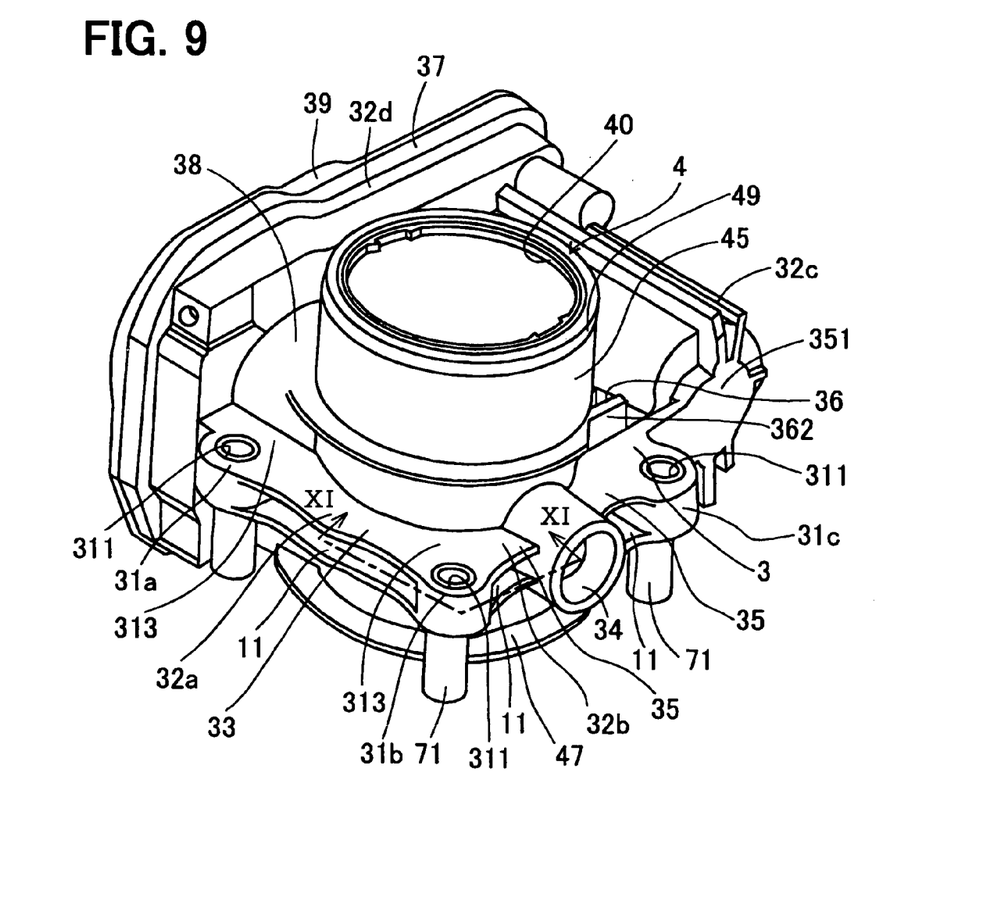
FIG. 9 is a perspective view of a throttle valve unit of a second embodiment.
Figure 10:
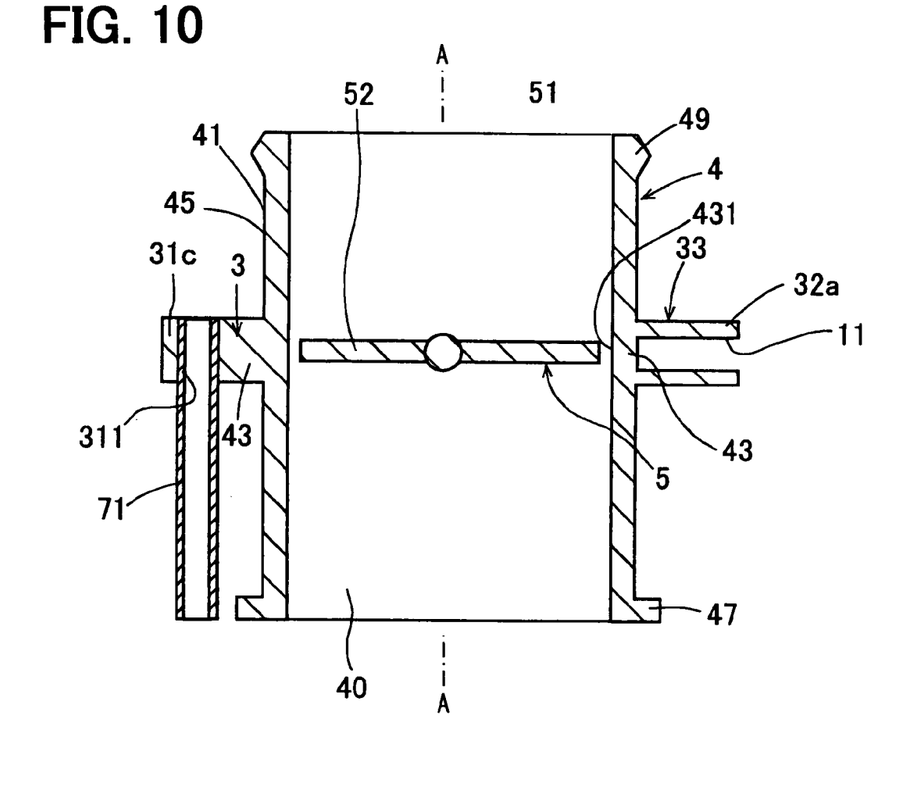
FIG. 10 is a sectional side view of the throttle valve unit of the second embodiment.
Figure 11:
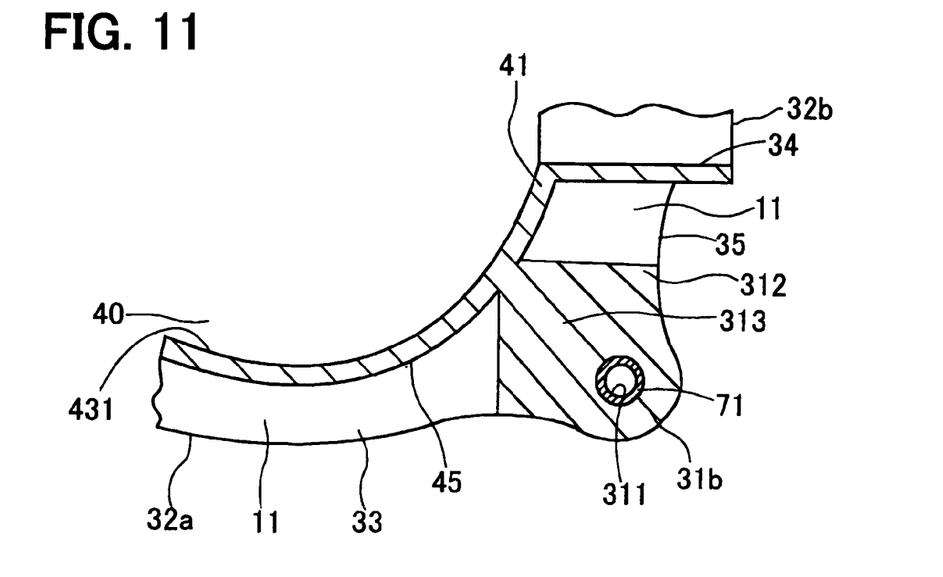
FIG. 11 is a sectional view of the throttle valve unit of the second embodiment taken along the line XI-XI of FIG. 9.

Another embodiment is shown in FIGS. 9-11 and is described below. The difference between this embodiment and the first embodiment is that a recessed portion 11 is included in the flange-shaped portions 33, 35 in the fastening portion 3. Components that are similar to the first embodiment are indicated with similar reference numerals, and redundant description is omitted.

As shown in FIG. 9 and FIG. 11, the flange-shaped portions 33, 35 of the fastening portion 3 each have recessed portions 11 extending transverse to the axis A. In other words, the recessed portions 11 each extend in the centrifugal direction of the cylinder portion 41. As shown in FIG. 11, the middle portions 313 on the cylinder portion 41 side of the mounting portions 31a, 31b, 31c are solid (i.e., do not have recessed portions). The flange-shaped portions 33, 35 having the recessed portions 11, as shown in FIG. 10, are reduced in thickness, whereby the support area 43 of the throttle valve 5 is made uniform in thickness.

It will be understood that when the flange-shaped portion 33, 35 is of relatively large thickness, the flange-shaped portion 33, 35 can take a relatively long time to cool during molding. As such, the support area 43 having the flange-shaped portions 33, 35 formed therein may shrink and deform. In this embodiment, however, the flange-shaped portions 33, 35 have the recessed portions 11, respectively, to reduce the thickness of the flange-shaped portions 33, 35. Hence, the support area 43 of the throttle valve 5 is made uniform in thickness. Thus, the support area 43 is less likely to shrink and deform during manufacture, which can effectively prevent the deformation of the inner peripheral surface 431 of the support area 43. Moreover, since the flange-shaped portions 33, 35 can be reduced in material thickness, the throttle valve unit can be reduced in weight and cost.

Embodiment 3

Figure 12:
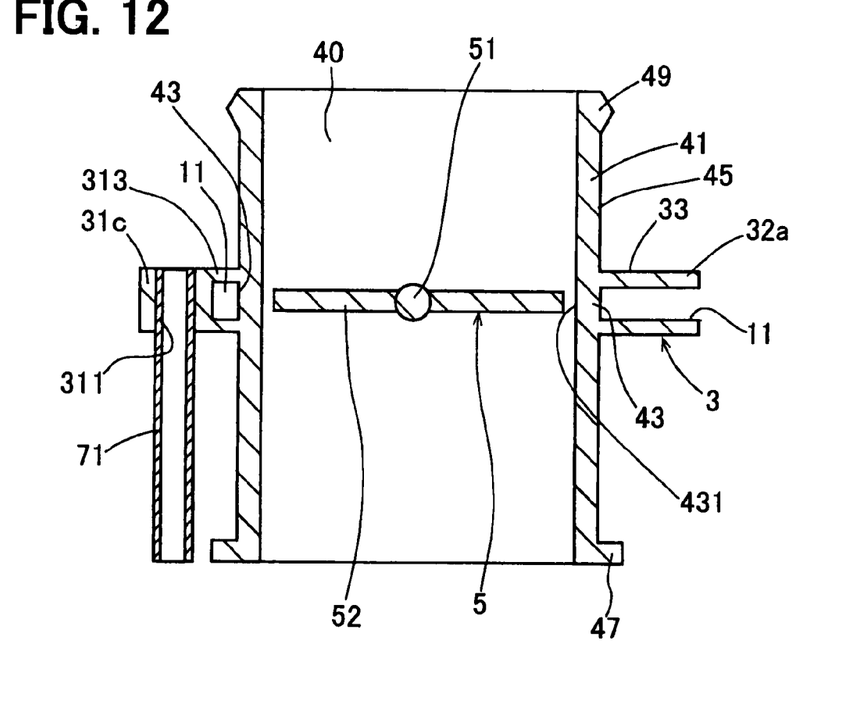
FIG. 12 is a sectional side view of a throttle valve unit of a third embodiment.
Figure 13:
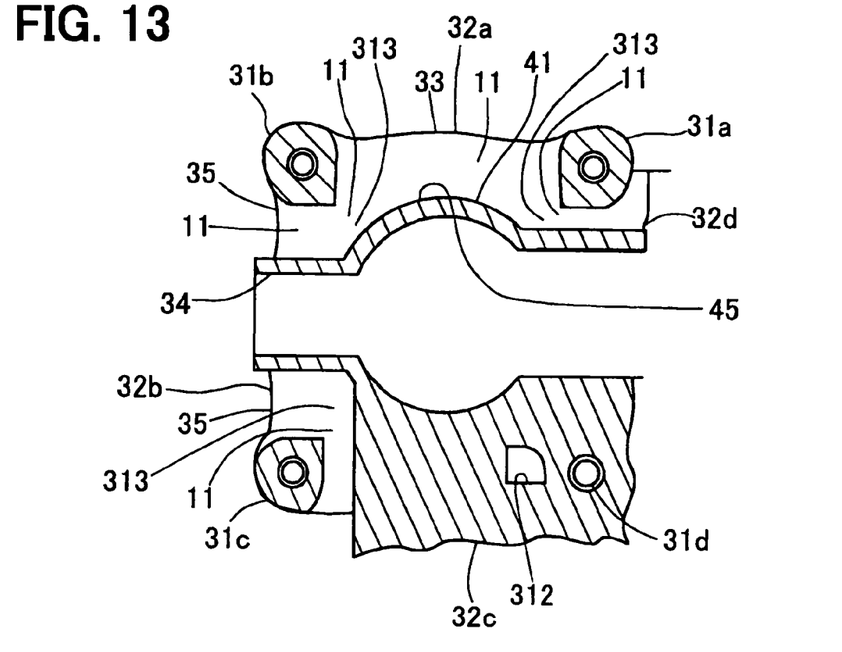
FIG. 13 is a sectional plan view of a fastening portion of the third embodiment.

Another embodiment is shown in FIGS. 12 and 13 and is described below. The difference between this embodiment and the second embodiment is that recessed portions are formed not only in the flange-shaped portion of the fastening portion but also in the mounting portions.

As shown FIG. 12 and FIG. 13, recessed portions 11 are formed not only in the flange-shaped portions 33, 35 of the fastening portion 3 but also in the middle portions 313 on the cylinder portion 41 side of the mounting portions 31a, 31b, 31c. In other words, the recessed portion 11 is provided between the bolt 7 and collar 71 and the cylinder portion 41. Moreover, the recessed portions 11 formed in the middle portions 313 reduce the thickness of the middle portions 313 such that the flange-shaped portions 33, 35 are reduced in rigidity in the axial direction and more easily deflected. For this reason, even if the abutment surface of the flange portion of the intake pipe causes a deviation from flatness, the mounting portions 31a, 31b, 31c are more likely to deflect along the abutment surface of the intake pipe to account for deformation caused by the deviation from flatness of the intake pipe. For this reason, the transmission of deformation to the cylinder portion 41 can be reduced.

Embodiment 4

Figure 14:
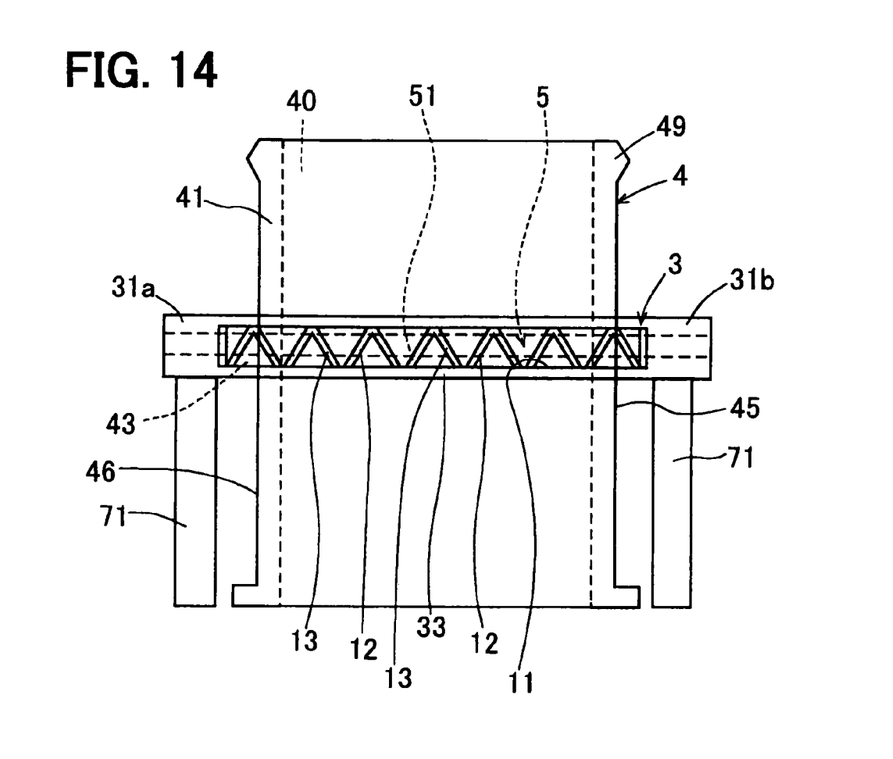
FIG. 14 is a side view of a throttle valve unit of a fourth embodiment.
Figure 15:
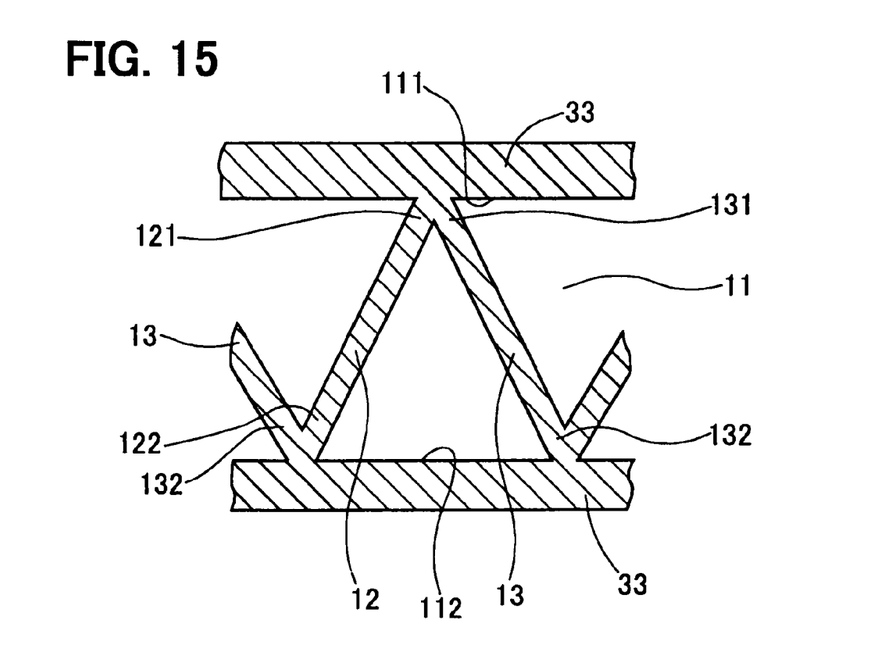
FIG. 15 is a sectional side view of a flange-shaped portion of the fourth embodiment.
Figure 16:
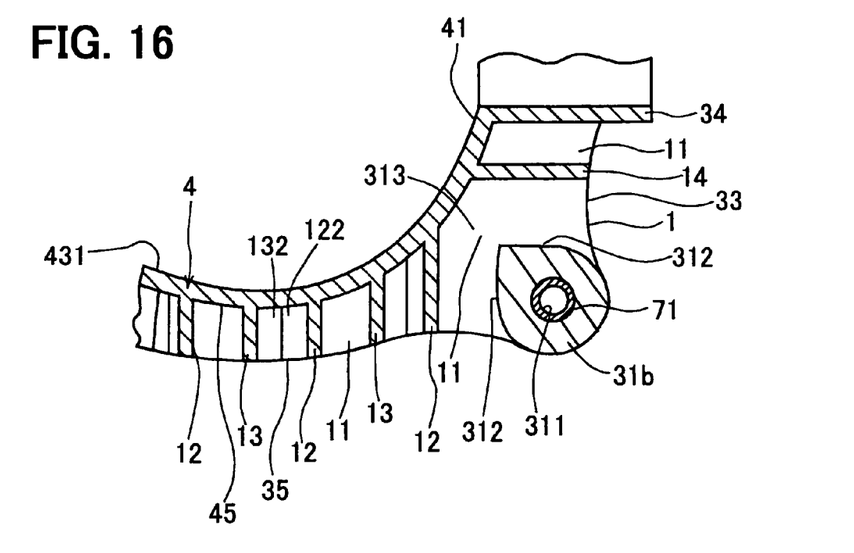
FIG. 16 is a sectional plan view of a flange-shaped portion of the fourth embodiment.

Still another embodiment is illustrated in FIGS. 14-16 and is described below. The difference between this embodiment and the third embodiment is that a plurality of ribs is formed in the recessed portion of the flange-shaped portion of the fastening portion.

As shown FIG. 14 to FIG. 16, a plurality of ribs 12, 13 extending in the centrifugal direction of the cylinder portion 41 are provided in the recessed portions 11 of the flange-shaped portion 33. As shown in FIG. 15, some of the ribs 12 are inclined upward to the right (i.e., at an acute angle) with respect to the axial direction of the cylinder portion 41 and the other ribs 13 are inclined upward to the left (i.e., at an opposite acute angle) with respect to the axial direction. The top end 121 of the ribs 12 and the top end 131 of adjacent ribs 13 are connected with each other at the top end 111 of the recessed portion 11, and the bottom end 122 of the ribs 12 and the bottom end 132 of adjacent ribs 13 are connected with each other at the bottom end 112 of the recessed portion 11. In this manner, the ribs 12, 13 form sequential triangles in a truss arrangement. This arrangement provides resistance to deformation in multiple directions of the applied force.

Moreover, the flange-shaped portion 35 between the bearing boss 34 and the mounting portion 31b also has a recessed portion 11 having a rib 14. The rib 14 extends in the centrifugal direction of the cylinder portion 41 and connects the top end and the bottom end of the recessed portion 11. This rib 14 extends generally along (i.e., parallel to) the axis A of the cylinder portion 41.

In this embodiment, the ribs 12, 13, 14 for connecting the top end and the bottom end of the recessed portions 11 of the flange-shaped portion 33, 35 are provided in the recessed portions 11. The flange-shaped portions 33, 35 are increased in rigidity in the axial direction of the cylinder portion 41 for improved structural performance. It is noted that the ribs 12, 13, 14 are included in the recessed portions 11 other than the recessed portion 11 provided between the collar 71 and the cylinder portion 41 to achieve the advantages of the third embodiment.

Embodiment 5

Figure 17:
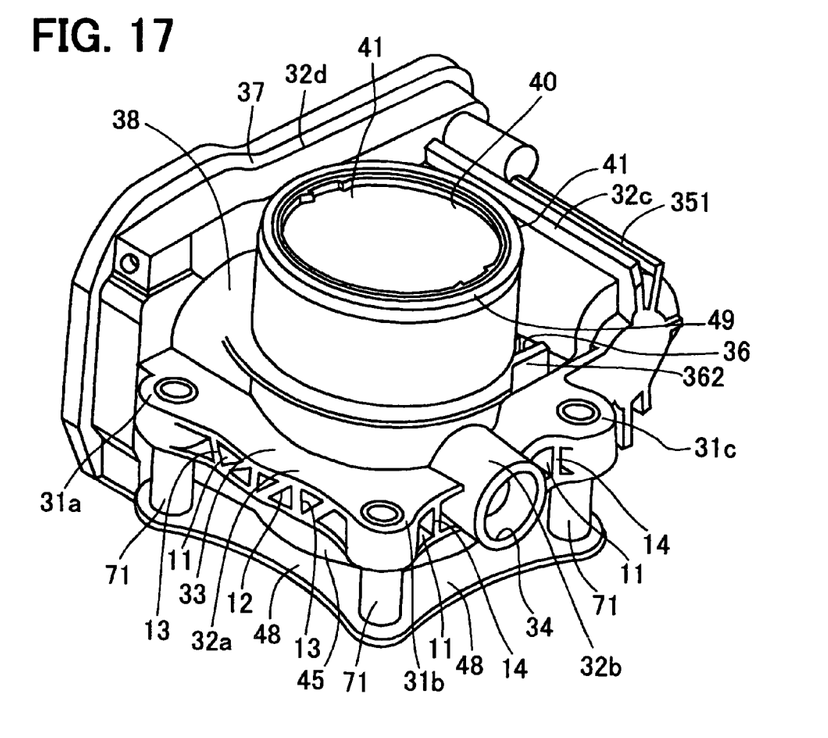
FIG. 17 is a perspective view of a throttle valve unit of a fifth embodiment.
Figure 18:
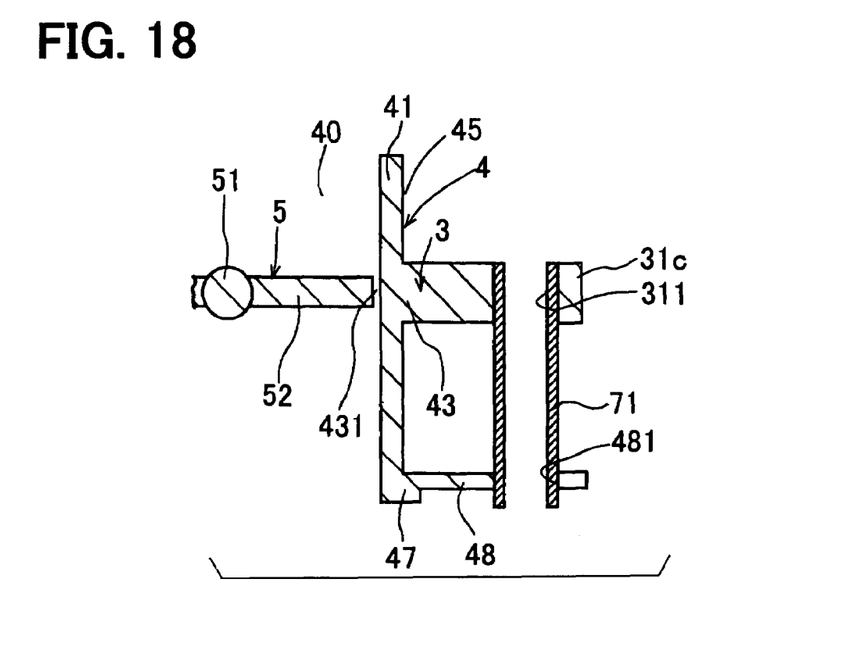
FIG. 18 is a sectional side view of the throttle valve unit of the fifth embodiment.
Figure 19:
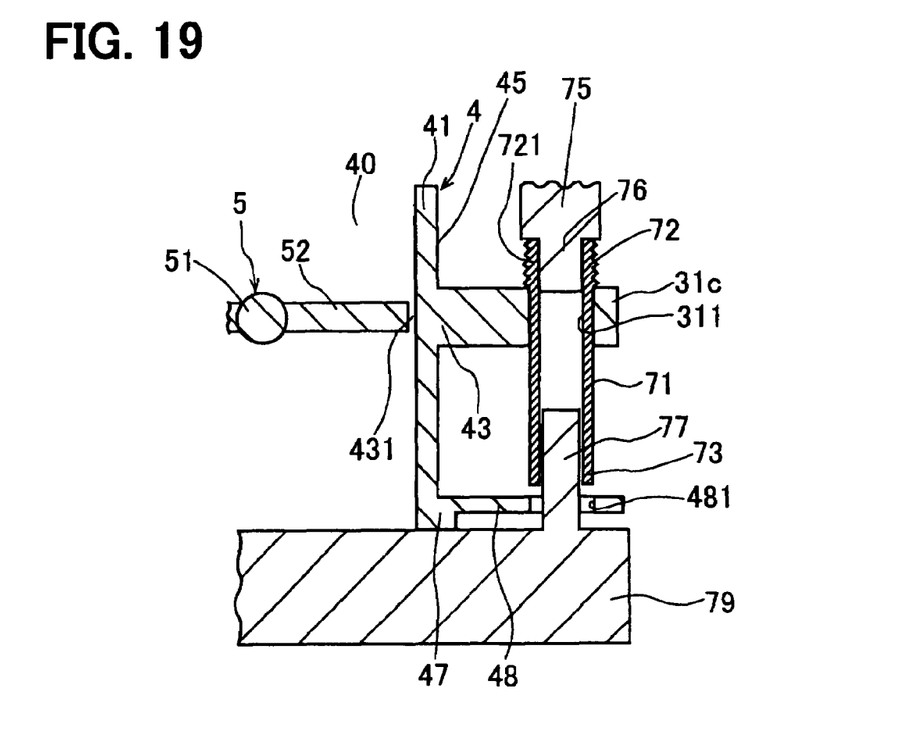
FIG. 19 is a detail sectional view of the throttle valve unit of the fifth embodiment.

Furthermore, another embodiment is illustrated in FIGS. 17-19. The difference between this embodiment and the fourth embodiment is that a positioning flange portion for positioning the collar fitted into the collar securing hole is formed on the outer peripheral surface of the cylinder portion.

As shown in FIG. 17 and FIG. 18, a positioning flange portion 48 extending in the centrifugal direction from the outer peripheral surface 45 of the cylinder portion 41 is provided near the portion of the cylinder portion 41 on which the intake pipe abuts. A positioning hole 481 for positioning the bottom portion of the collar 71 is formed in the flange portion 48.

When the collar 71 is inserted into the positioning hole 481, as shown in FIG. 19, a jig 79 is prepared on which a guide bar 77 for guiding the collar 71 is erected. Then, the throttle valve unit is placed on the jig 79 and the guide bar 77 is inserted into the positioning hole 481. When the collar 71 is thermally pressed into the collar securing hole 311 by the use of the heating pressing device 75 similar to the first embodiment, the bottom portion 73 of the collar 71 is guided by the guide bar 77 for insertion into the positioning hole 481.

The bottom portion 73 of the collar 71 is positioned by the positioning hole 481, thereby being easily screwed into the threaded hole formed in the flange portion of the intake pipe.

Other Embodiments

Thus, while only the selected preferred embodiments have been chosen for description, it will be apparent to those skilled in the art that various changes and modifications can be made therein without departing from the scope of the disclosure as defined in the appended claims. Furthermore, the foregoing description of the embodiments according to the present disclosure is provided for illustration only, and not for the purpose of limiting the disclosure as defined by the appended claims and their equivalents.

What is claimed is:

1. A throttle valve unit comprising:
   a main body having a cylinder portion defining a fluid passage and a fastening portion projecting from an outer peripheral surface of the cylinder portion for fastening to a separate member, wherein the cylinder portion defines an axis; and
   a throttle valve that is rotatably supported by the cylinder portion for opening and closing the fluid passage, wherein the throttle valve is supported by the cylinder portion at a support area;
   wherein the fastening portion is provided at approximately the same axial position relative to the axis as the support area of the throttle valve and includes a plurality of mounting portions for coupling to the separate member and a plurality of connecting portions extending between the mounting portions.

2. The throttle valve unit as claimed in claim 1, wherein the fastening portion has a flange-shaped portion formed along the outer peripheral surface of the cylinder portion.

3. The throttle valve unit as claimed in claim 1, wherein at least one of the connecting portions includes a bearing boss for rotatably supporting a shaft of the throttle valve.

4. The throttle valve unit as claimed in claim 1, wherein at least one of the connecting portions includes a driving chamber for housing a driving device that drives the throttle valve.

5. The throttle valve unit as claimed in claim 4, wherein at least one of the connecting portions includes a gear chamber for housing a gear mechanism that transmits rotational driving force to the throttle valve from the driving member to thereby drive the throttle valve.

6. The throttle valve unit as claimed in claim 1, wherein the fastening portion has a recessed portion that extends in a direction transverse to the axis.

7. The throttle valve unit as claimed in claim 6, further comprising a plurality of ribs provided in the recessed portion.

8. The throttle valve unit as claimed in claim 7, wherein at least one of the ribs extends generally parallel to the axis.

9. The throttle valve unit as claimed in claim 7, wherein at least one of the ribs extends at an acute angle with respect to the axis and at least one other of the ribs extends at an opposite acute angle with respect to the axis.

10. The throttle valve unit as claimed in claim 1, wherein the fastening portion has a recessed portion, and wherein the fastening portion includes a mounting portion with a fastener for coupling to the separate member, and wherein the recessed portion is provided between the fastener and the cylinder portion.

11. The throttle valve unit as claimed in claim 10, wherein the fastening portion includes a plurality of recessed portions including the recessed portion provided between the fastener and the cylinder portion, wherein the fastening portion includes a rib, and wherein the rib is included in the recessed portions other than the recessed portion provided between the fastener and the cylinder portion.

12. The throttle valve unit as claimed in claim 1, wherein the fastening portion is integrally coupled to the cylinder portion.

* * * * *